(12) United States Patent
Cheung et al.

(10) Patent No.: US 9,019,340 B2
(45) Date of Patent: Apr. 28, 2015

(54) CONTENT AWARE SELECTIVE ADJUSTING OF MOTION ESTIMATION

(75) Inventors: Kin-Hang Cheung, San Jose, CA (US); Ping Liu, Sunnyvale, CA (US)

(73) Assignee: Intel Corporation, Santa Clara, CA (US)

(*) Notice: Subject to any disclaimer, the term of this patent is extended or adjusted under 35 U.S.C. 154(b) by 6 days.

(21) Appl. No.: 13/977,446

(22) PCT Filed: Mar. 28, 2012

(86) PCT No.: PCT/US2012/030797
§ 371 (c)(1),
(2), (4) Date: Jun. 28, 2013

(87) PCT Pub. No.: WO2013/147756
PCT Pub. Date: Oct. 3, 2013

(65) Prior Publication Data
US 2014/0192133 A1    Jul. 10, 2014

(51) Int. Cl.
| | |
|---|---|
| H04N 7/15 | (2006.01) |
| H04N 19/53 | (2014.01) |
| H04N 19/54 | (2014.01) |
| H04N 19/543 | (2014.01) |
| H04N 5/14 | (2006.01) |
| H04N 7/14 | (2006.01) |

(52) U.S. Cl.
CPC .......... *H04N 19/53* (2014.11); *H04N 5/144* (2013.01); *H04N 7/141* (2013.01); *H04N 19/54* (2014.11); *H04N 19/543* (2013.01)

(58) Field of Classification Search
CPC ........ H04N 19/006; H04N 7/15; H04N 7/141
USPC ............... 348/14.1, 452, 497; 375/240.02, 375/240.16; 713/176
See application file for complete search history.

(56) References Cited

U.S. PATENT DOCUMENTS

| | | | | |
|---|---|---|---|---|
| 4,672,445 | A * | 6/1987 | Casey et al. | 348/450 |
| 5,502,482 | A * | 3/1996 | Graham | 348/140 |
| 5,543,858 | A * | 8/1996 | Wischermann | 348/618 |
| 5,682,205 | A * | 10/1997 | Sezan et al. | 348/452 |
| 6,118,489 | A * | 9/2000 | Han et al. | 348/452 |
| 6,400,762 | B2 * | 6/2002 | Takeshima | 375/240.01 |
| 6,567,468 | B1 * | 5/2003 | Kato et al. | 375/240.12 |
| 6,597,738 | B1 * | 7/2003 | Park et al. | 375/240.16 |
| 6,687,300 | B1 * | 2/2004 | Fujita et al. | 375/240.16 |
| 7,003,037 | B1 * | 2/2006 | Bordes et al. | 375/240.16 |
| 7,170,562 | B2 * | 1/2007 | Yoo et al. | 348/452 |
| 7,268,835 | B2 * | 9/2007 | Babonneau et al. | 348/607 |
| 7,365,801 | B2 * | 4/2008 | Kondo | 348/620 |
| 7,489,829 | B2 * | 2/2009 | Sorek et al. | 382/260 |
| 8,180,171 | B2 * | 5/2012 | Lin | 382/264 |

(Continued)

FOREIGN PATENT DOCUMENTS

GB    2343945 A    5/2000

OTHER PUBLICATIONS

International Search Report and Written opinion for PCT Patent Application No. PCT/US2012/030797, mailed on Nov. 20, 2012, 9 Pages.

*Primary Examiner* — Gerald Gauthier
(74) *Attorney, Agent, or Firm* — Lynch Law Patent Group, P.C.

(57) ABSTRACT

Systems, apparatus, articles, and methods are described including operations for content aware selective adjusting of motion estimation.

25 Claims, 6 Drawing Sheets

(56) References Cited

U.S. PATENT DOCUMENTS

| | | | |
|---|---|---|---|
| 8,208,067 B1* | 6/2012 | Singh et al. | 348/497 |
| 8,649,438 B2* | 2/2014 | Li et al. | 375/240.16 |
| 8,780,991 B2* | 7/2014 | Kwon et al. | 375/240.16 |
| 2004/0158719 A1* | 8/2004 | Lee et al. | 713/176 |
| 2006/0222251 A1 | 10/2006 | Zhang | |
| 2007/0121724 A1* | 5/2007 | Van Zon et al. | 375/240.16 |
| 2007/0230576 A1 | 10/2007 | Heller et al. | |
| 2008/0309823 A1* | 12/2008 | Hahn et al. | 348/606 |
| 2009/0207915 A1* | 8/2009 | Yan et al. | 375/240.16 |
| 2009/0238277 A1* | 9/2009 | Meehan | 375/240.16 |
| 2011/0164677 A1* | 7/2011 | Lu et al. | 375/240.02 |
| 2014/0192133 A1* | 7/2014 | Cheung et al. | 348/14.1 |

\* cited by examiner

CONTENT AWARE SELECTIVE ADJUSTING OF MOTION ESTIMATION

BACKGROUND

Video conference applications are becoming ubiquitous on mobile devices. Existing implementations of decode and encode pipelines on many graphics processing unit (GPU) hardware are for general purpose usage. Decode pipelines are typically capable of supporting media content of different profiles and encode pipelines are typically capable of generating high quality output regardless of the amount of motion in the content.

Typically, content in video conferencing usage does not have a lot of motions when adult users are just chatting. However, sometimes the users can be active children having an increased amount of motion. Likewise, content in video conferencing usage may have a lot of motions when users are perform panning of the surrounding environment.

Hierarchical motion estimation (HME) and Super HME are quick sync. video features that may typically be used to improve quality in encoded content. For example, HME and/or Super HME may improve quality in encoded content when the content has a lot of motions. However HME and/or Super HME may cost extra power because HME and/or Super HME may consume both GPU processing cycles and memory bandwidth.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
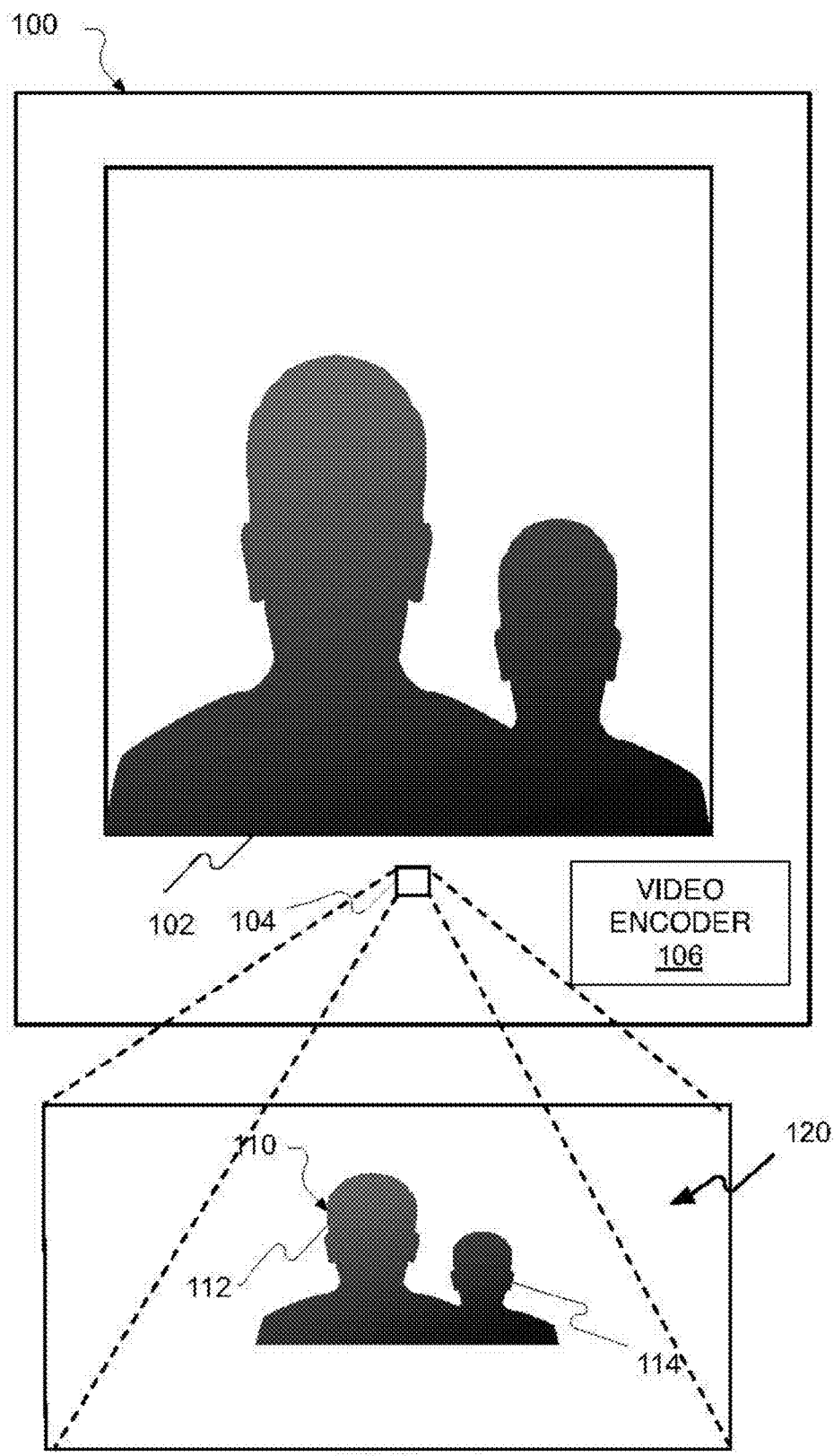
FIG. 1 is an illustrative diagram of an example selective motion estimation system.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smart phones, etc., may implement the techniques and/or arrangements described herein. Further, while the following description may set forth numerous specific details such as logic implementations, types and interrelationships of system components logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to effect such feature, structure, or characteristic in connection with other implementations whether or not explicitly described herein.

Systems, apparatus, articles, and methods are described below including operations for content aware selective adjusting of motion estimation.

As described above, in some cases, decode pipelines are typically capable of supporting media content of different profiles and encode pipelines are typically capable of generating high quality output regardless of the amount of motion in the content. Accordingly, to accommodate different usage models, drivers typically cannot perform any power optimization without impacting the video quality.

As will be described in greater detail below, operations for content aware selective adjusting of motion estimation may utilize visual data inputs to be capable of determining what level of motion estimation to apply. Accordingly, various motion estimation levels may be selectively applied by leveraging visual information processing techniques. For example, a determination may be made regarding the amount of motion that is occurring in received visual data. The level of motion estimation to apply to the received visual data may be selectively adjusted based at least in part on the determined amount of motion. Accordingly, content aware selective adjusting of motion estimation may, in some situations, provide a certain level of power optimization.

FIG. 1 is an illustrative diagram of an example selective motion estimation system 100, arranged in accordance with at least some implementations of the present disclosure. In the illustrated implementation, selective motion estimation system 100 may include a display 102, an imaging device 104, and a video encoder 106. In some examples, selective motion estimation system 100 may include additional items that have not been shown in FIG. 1 for the sake of clarity. For example, selective motion estimation system 100 may include a processor, a radio frequency-type (RF) transceiver, and/or an antenna. Further, selective motion estimation system 100 may include additional items such as a speaker, a microphone, an accelerometer, memory, a router, network interface logic, etc. that have not been shown in FIG. 1 for the sake of clarity.

Imaging device 104 may be configured to capture visual data from one or more users 110 of selective motion estimation system 100. For example, imaging device 104 may be configured to capture visual data from a first user 112, a second user 114, from one or more additional users, the like, and/or combinations thereof. In some examples, imaging device 104 may be located on selective motion estimation system 100 so as to be capable of viewing users 110 while users 110 are viewing display 102.

In some examples, visual data of the first user may be captured via a camera sensor-type imaging device 104 or the like (e.g., a complementary metal-oxide semiconductor-type image sensor (CMOS) or a charge-coupled device-type image sensor (CCD)), without the use of a red-green-blue (RGB) depth camera and/or microphone-array to locate who is speaking. In other examples, an RGB-Depth camera and/or microphone-array might be used in addition to or in the alternative to the camera sensor. In some examples, imaging device 104 may be provided via either a peripheral motion tracking camera or as an integrated a peripheral motion tracking camera in selective motion estimation system 100.

In operation, selective motion estimation system 100 may utilize visual data inputs to be capable of determining what level of motion estimation to apply. Accordingly, selective motion estimation system 100 may be capable of performing selective application of various motion estimation levels by leveraging visual information processing techniques. For example, selective motion estimation system 100 may receive visual data from imaging device 104 from one or more users 110. A determination may be made regarding the amount of motion that is occurring in the received visual data. The level of motion estimation to apply to the received visual data may be selectively adjusted based at least in part on the determined amount of motion. In some examples, video encoder 106 may be configured to encode the received video data based at least in part on the selectively adjusted motion estimation.

In some examples, motion tracking may be performed for at least one of the one or more users 110. For example, the motion tracking may be performed based at least in part on the received visual data 130. A target user 112 and/or a background area 120 may be identified. For example, facial detection may be performed, for at least one of one or more users, based at least in part on the received visual data. Target user 112 and/or background area 120 may be identified based at least in part on the performed facial detection. The determination of the amount of motion may include a determination of the amount of motion based on the target user and not the background area. Accordingly, selective motion estimation system 100 may be capable of performing selective application of various motion estimation levels by being content aware.

In some examples, the motion estimation may be adjusted between a base level of motion estimation and an enhanced level of motion estimation. The base level of motion estimation is associated with a first level of downscaled visual data and the enhanced level of motion estimation is associated with a second level of visual data where the second level of downscaling is greater than the first level of downscaling. The base level of motion estimation may include hierarchical motion estimation (HME) or the like and the enhanced level of motion estimation may include super hierarchical motion estimation (Super HME) or the like.

In one example, selective motion estimation system 100 may be aware of whether a high amount motion is associated with target user 112 and/or background area. In cases where a high amount motion is not associated with target user 112 (e.g., there is no high amount of motion or any high motion is associated with background area 120 instead of target user 112), selective motion estimation system 100 may apply a base level of motion estimation. Conversely, in cases where a high amount motion is associated with target user 112, selective motion estimation system 100 may apply an enhanced level of motion estimation.

In other examples, power tracking may be utilized by selective motion estimation system 100. For example, such power tracking may involve monitoring power supply data, wherein the power supply data may include an indication of a current power source and/or an indication of battery charge level. Such an indication of the current power source may indicate whether the current power source is a battery-type power source or an external power source. Accordingly, selective motion estimation system 100 may be capable of performing selective application of various motion estimation levels by being power aware. In one example, selective motion estimation system 100 may aware of whether the current power source is a battery-type power source or an external power source and/or aware of the battery charge level. In cases where the current power source is an external power source, selective motion estimation system 100 may apply an enhanced level of motion estimation. Conversely, in cases where the current power source is a battery-type power source and the battery charge level is low, selective motion estimation system 100 may apply a base level of motion estimation.

In other examples, both motion tracking and power tracking may be utilized by selective motion estimation system 100. For example, a balancing policy may take into account both the motion tracking data and the power tracking data when selective motion estimation system 100 determines the selective application of various motion estimation levels. For example, in cases where the current power source is a battery-type power source and the battery charge level is not low, selective motion estimation system 100 may still apply a base level of motion estimation if it is also determined that a high amount motion is not associated with target user 112 (e.g., there is no high amount of motion or any high motion is associated with background area 120 instead of target user 112).

As will be discussed in greater detail below, selective motion estimation system 100 may be used to perform some or all of the various functions discussed below in connection with FIGS. 2 and/or 3.

Figure 2:
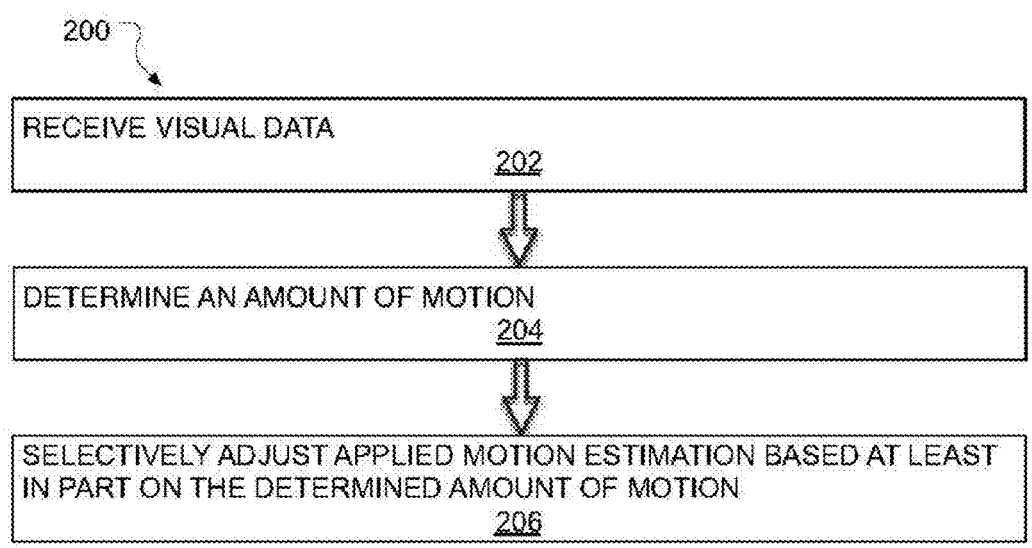
FIG. 2 is a flow chart illustrating an example selective motion estimation process.

FIG. 2 is a flow chart illustrating an example selective motion estimation process 200, arranged in accordance with at least some implementations of the present disclosure. In the illustrated implementation, process 200 may include one or more operations, functions or actions as illustrated by one or more of blocks 202, 204, and/or 206. By way of non-limiting example, process 200 will be described herein with reference to example selective motion estimation system 100 of FIGS. 1 and/or 4.

Process 200 may be utilized as a computer-implemented method for content aware selective adjusting of motion estimation. Process 200 may begin at block 202, "RECEIVE VISUAL DATA", where visual data may be received. For example, the received visual data may include video of one or more users.

Processing may continue from operation 202 to operation 204, "DETERMINE AN AMOUNT OF MOTION", where an amount of motion may be determined. For example, the amount of motion may be determined based at least in part on the received visual data.

Processing may continue from operation 204 to operation 206, "SELECTIVELY ADJUST APPLIED MOTION ESTIMATION BASED AT LEAST IN PART ON THE DETERMINED AMOUNT OF MOTION", where an applied motion estimation may be selectively adjusted based at least in part on the determined amount of motion. For example, a motion estimation applied to the received visual data may be selectively adjusted based at least in part on the determined amount of motion.

In operation, process 200 may utilize smart and context aware responses to user motion queues. For example, process 200 may be capable of telling a user's amount of motion to selectively adjust the level of motion estimation to apply.

Some additional and/or alternative details related to process 200 may be illustrated in one or more examples of implementations discussed in greater detail below with regard to FIG. 3.

Figure 3:
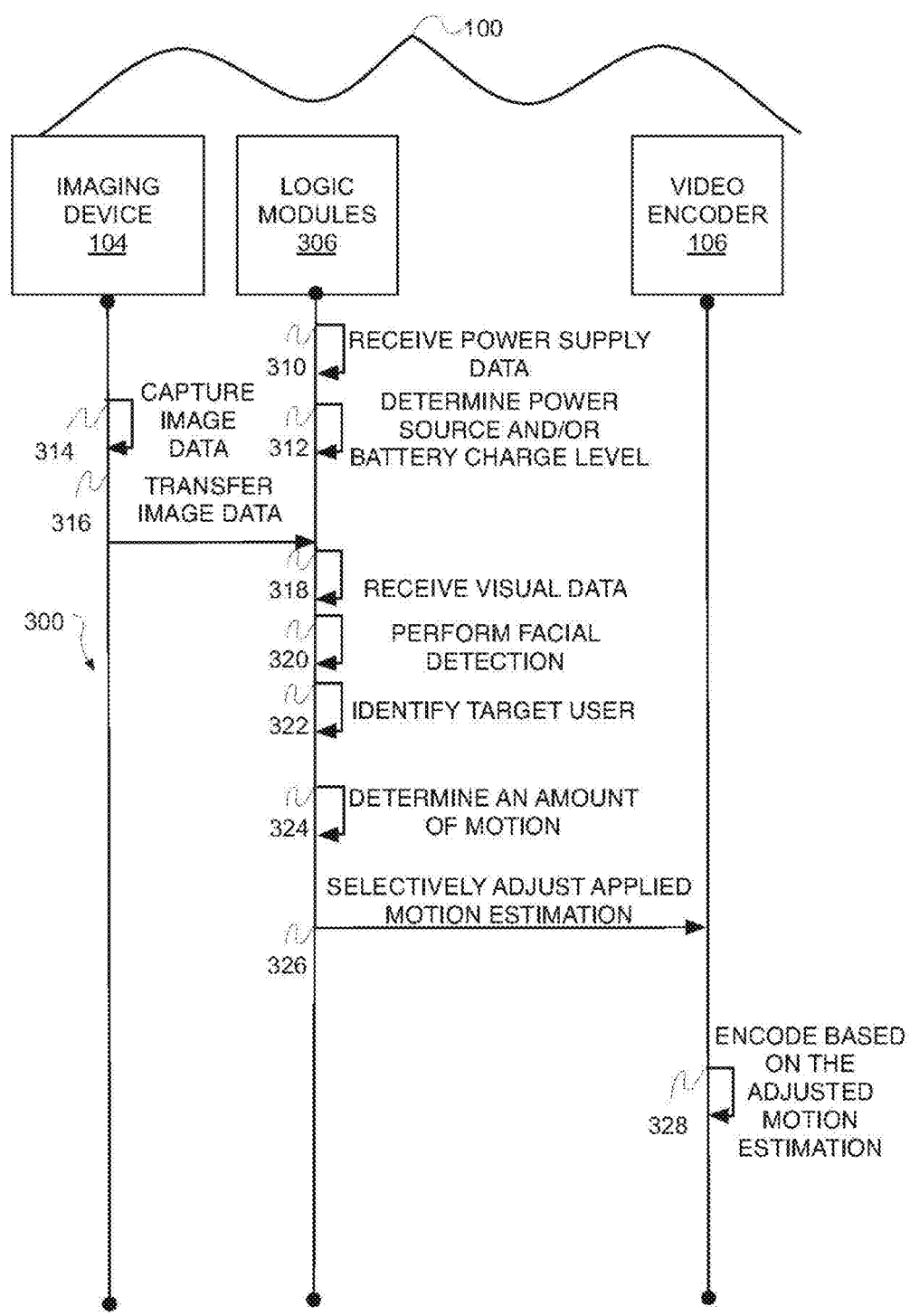
FIG. 3 is an illustrative diagram of an example selective motion estimation system in operation.

FIG. 3 is an illustrative diagram of example selective motion estimation system 100 and selective motion estimation process 300 in operation, arranged in accordance with at least some implementations of the present disclosure. In the illustrated implementation, process 300 may include one or more operations, functions or actions as illustrated by one or more of actions 310, 311, 312, 314, 316, 318, 320, 322, 324, 326, and/or 328. By way of non-limiting example, process 300 will be described herein with reference to example selective motion estimation system 100 of FIGS. 1 and/or 4.

In the illustrated implementation, selective motion estimation system 100 may include display 102, logic modules 306, video encoder 106, the like, and/or combinations thereof. Although selective motion estimation system 100, as shown in FIG. 3, may include one particular set of blocks or actions associated with particular modules, these blocks or actions may be associated with different modules than the particular module illustrated here.

Process 300 may begin at block 310, "RECEIVE POWER SUPPLY DATA", where power supply data may be captured. For example, capturing of power supply data may be performed in conjunction with a power supply (not shown, such as a battery or the like). The power supply data may include an indication of a current power source and/or an indication of battery charge level.

Processing may continue from operation 310 to operation 312, "DETERMINE POWER SOURCE AND/OR BATTERY CHARGE LEVEL", where power source and/or battery charge level may be determined. For example, the power supply data may supply an indication of the current power source (e.g., the power supply data may indicate whether the current power source is a battery-type power source or an external power source. Additionally, the power supply data may supply an indication of the battery charge level.

Processing may continue from operation 312 to operation 314, "CAPTURE IMAGE DATA", where image data may be captured. For example, capturing of image data may be performed via imaging device 104.

Processing may continue from operation 314 to operation 316, "TRANSFER IMAGE DATA", where image data may be transferred. For example, image data may be transferred from imaging device 104 to logic modules 306.

Processing may continue from operation 316 to operation 318, "RECEIVE VISUAL DATA", where visual data may be received. For example, the received visual data may include video of one or more users.

Processing may continue from operation 318 to operation 320, "PERFORM FACIAL DETECTION", where facial detection may be performed. For example, the face of the one or more users may be detected based at least in part on visual data.

In some examples, such face detection may be configured to differentiate between the one or more users. Such facial detection techniques may allow relative accumulations to include face detection, motion tracking, landmark detection, face alignment, smile/blink/gender/age detection, face recognition, detecting two or more faces, and/or the like. For example, age detection might be used to identify whether the target user is a child.

In some examples, the detection of the face may include detecting the face based at least in part on a Viola-Jones-type framework (see, e.g., Paul Viola, Michael Jones, Rapid Object Detection using a Boosted Cascade of Simple Features, CVPR 2001 and/or PCT/CN2010/000997, by Yangzhou Du, Qiang Li, entitled TECHNIQUES FOR FACE DETECTION AND TRACKING, filed Dec. 10, 2010). Such facial detection techniques may allow relative accumulations to include face detection, landmark detection, face alignment, smile/blink/gender/age detection, face recognition, detecting two or more faces, and/or the like.

Processing may continue from operation 320 to operation 322, "IDENTIFY TARGET USER", where a target user may be identified. For example, face detection may be utilized to differentiate between a target user and a background area. The target user and background area may be identified based at least in part on the performed facial detection.

As used herein, the term "background" may refer to an area of a video image not defined as the target user, and may include image portions located behind or in front (e.g., foreground) of a determined the target user.

Processing may continue from operation 318 and/or operation 322 to operation 324, "DETERMINE AN AMOUNT OF MOTION", where an amount of motion may be determined. For example, the amount of motion may be determined based at least in part on the received visual data from operation 318. Additionally or alternatively, the amount of motion may be determined based at least in part on the identified target user (e.g., and not the background area) from operation 322.

Processing may continue from operation 312, operation 320 and/or operation 324 to operation 326, "SELECTIVELY ADJUST APPLIED MOTION ESTIMATION", where an applied motion estimation may be selectively adjusted. For example, a motion estimation applied to the received visual data may be selectively adjusted based at least in part on the determined amount of motion of operation 324. In another example, the motion estimation applied to the received visual data may be selectively adjusted based at least in part on the determined power source and/or battery charge level of operation 312. Additionally or alternatively, the motion estimation applied to the received visual data may be selectively adjusted based at least in part on a combination of the determined amount of motion of operation 324 and/or the determined power source and battery charge level of operation 312.

Additionally or alternatively, in some examples, operation 320 may include age detection to identify whether the target user is a child. For example, process 300 may operate so that the motion estimation applied to the received visual data may be selectively adjusted based at least in part on a determination that the target user is a child. In such a case, process 300 may presume that a child is not likely to be a consistently still subject. Accordingly, process 300 may selectively adjust the motion estimation to the enhanced level of motion estimation in response to an indication that the target user is a child.

Additionally or alternatively, in some examples, operations 310-326 may be operated in a dynamic feedback control loop. Accordingly, a motion estimation applied to the received visual data may be continuously adjusted as power conditions change, movement conditions change, or as the identification of the target user changes.

In some examples, the motion estimation may be adjusted between a base level of motion estimation and an enhanced level of motion estimation. The base level of motion estimation is associated with a first level of downscaled visual data and the enhanced level of motion estimation is associated with a second level of visual data where the second level of downscaling is greater than the first level of downscaling. The base level of motion estimation may include hierarchical motion estimation (HME) or the like and the enhanced level of motion estimation may include super hierarchical motion estimation (Super HME) or the like.

Processing may continue from operation 326 to operation 328, "ENCODE BASED ON THE ADJUSTED MOTION ESTIMATION", where the adjusted motion estimation may be utilized during encoding. For example, video encoder 106 may encode the received video data based at least in part on the selectively adjusted motion estimation.

In operation, some aspects of process 300 may be implemented through a device driver interface (DDI). In some examples media driver software might introduce a virtual video driver such as a kernel level driver (e.g., a device driver interface (DDI) as a kernel level driver of Windows™ OS). Such a virtual video driver may be utilized for video conferencing application or middleware to control the HME and Super HME features based on the usage model (e.g., via power tracking) and/or media content (e.g., via motion tracking or age detection).

For example, by analyzing the amount of motion in the video content and identify the target user during runtime, virtual video driver software can provide dynamic feedback during runtime to the video conferencing applications or middleware. When there is little motion detected in the usage, applications can select between HME or Super HME features via the virtual video driver. However, when amount of motion goes up, applications can enable the Super HME to improve the visual quality. In addition, the applications may disregard the loss of quality of any moving content in the background (e.g. TV, people who walk by behind the main subject, or the like) and simply allocate a bigger percentage of the given bit-rate budget for encoding the target user in the foreground of the conference session. As a result, features for improving quality of moving objects may not be falsely enabled when the target user is very steady.

Accordingly, process 300 may be implemented for content aware optimization processing of video content. Media driver software can implement the feedback control loop within itself and expose the power saving feature control via the virtual video driver. Instead of implementing the control logic, the application can simply invoke the virtual video driver to control the content aware power optimization policy. For example, virtual video driver software can provide several different policies (a low power/quality policy, a balanced power/quality policy, and a high power/quality policy) for the application to choose. In a low power/quality policy, virtual video driver software can optimize for power at the expense of quality. In a high power/quality, virtual video driver software may not attempt any power optimization and puts quality as the top priority. In a balanced power/quality policy, virtual video driver software may provide a quality/power tradeoff based on the content characteristics (e.g. amount of motion).

In one example, the selectively adjusted motion estimation applied to the received visual data may include selectively adjusting the motion estimation to the enhanced level of motion estimation in response to an indication that the current power source is an external power source.

In a further example, the selectively adjusted motion estimation applied to the received visual data may include selectively adjusting the motion estimation to the base level of motion estimation in response to an indication that the current power source is a battery-type power source and/or an indication that the battery charge level is below a charge threshold value.

In a still further example, the selectively adjusted motion estimation applied to the received visual data may include selectively adjusting the motion estimation to the enhanced level of motion estimation in response to an indication that the current power source is a battery-type power source, an indication that the battery charge level is above a given threshold value, and/or an indication that the determined amount of motion is above a motion threshold value.

In another example, the selectively adjusted motion estimation applied to the received visual data may include selectively adjusting the motion estimation to the base level of motion estimation in response to an indication that the current power source is a battery-type power source, an indication that the battery charge level is above a given threshold value, and/or an indication that the determined amount of motion is below a motion threshold value.

While implementation of example processes 200 and 300, as illustrated in FIGS. 2 and 3, may include the undertaking of all blocks shown in the order illustrated, the present disclosure is not limited in this regard and, in various examples, implementation of processes 200 and 300 may include the undertaking only a subset of the blocks shown and/or in a different order than illustrated.

In addition, any one or more of the blocks of FIGS. 2 and 3 may be undertaken in response to instructions provided by one or more computer-program products. Such program products may include signal bearing media providing instructions that, when executed by, for example, a processor, may provide the functionality described herein. The computer-program products may be provided in any form of computer-readable medium. Thus, for example, a processor including one or more processor core(s) may undertake one or more of the blocks shown in FIGS. 2 and 3 in response to instructions conveyed to the processor by a computer-readable medium.

As used in any implementation described herein, the term "module" refers to any combination of software, firmware and/or hardware configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 4:
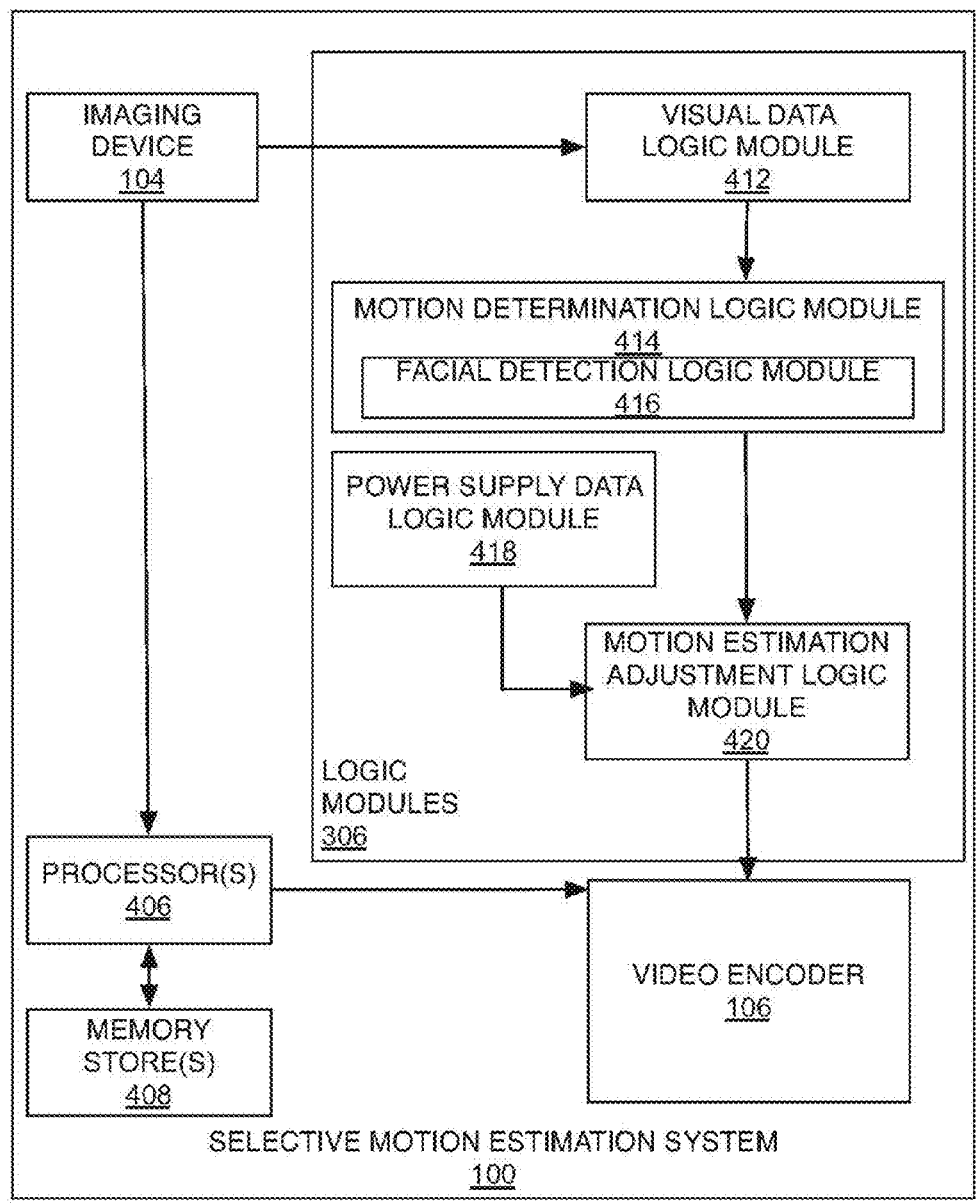
FIG. 4 is an illustrative diagram of an example selective motion estimation system.

FIG. 4 is an illustrative diagram of an example selective motion estimation system 100, arranged in accordance with at least some implementations of the present disclosure. In the illustrated implementation, selective motion estimation system 100 may include display 102 (FIG. 1), imaging device 104, video encoder 106, and/or logic modules 306. Logic modules 306 may include a visual data logic module 412, a motion determination logic module 414, a facial detection logic module 416, a power supply data logic module 418, a motion estimation adjustment logic module 420, the like, and/or combinations thereof.

As illustrated, display 102 (FIG. 1.), imaging device 104, video encoder 106, processor 402 and/or memory store 404 may be capable of communication with one another and/or communication with portions of logic modules 306. Although selective motion estimation system 100, as shown in FIG. 4, may include one particular set of blocks or actions associated with particular modules, these blocks or actions may be associated with different modules than the particular module illustrated here.

In some examples, imaging device 104 may be configured to capture visual data. Processors 402 may be communicatively coupled to display 102 (FIG. 1), imaging device 104, and/or video encoder. Memory stores 404 may be communicatively coupled to processors 402. Visual data logic module 412, motion tracking logic module 414, target user logic module 416, and/or selective motion estimation logic module 418 may be communicatively coupled to processors 402 and/or memory stores 404.

In some examples, visual data logic module 412 may be communicatively coupled to imaging device 104 and may be configured to receive visual data, where the visual data includes video of one or more users. Motion determination logic module 414 may be communicatively coupled to visual data logic 412 module and may be configured to determine a amount of motion based at least in part on the received visual data. Motion estimation adjustment logic module 420 may be communicatively coupled to motion determination logic module 414 and may be configured to selectively adjust a motion estimation applied to the received visual data based at least in part on the determined amount of motion. Video encoder 106 may be communicatively coupled to motion estimation adjustment logic module 420 and may be configured to encode the received video data based at least in part on the selectively adjusted motion estimation.

In some examples, facial detection logic module 416 may be communicatively coupled to visual data logic module 412. Facial detection logic module 416 may be configured to perform facial detection for at least one of one or more users based at least in part on the received visual data and may identify a target user and/or a background area based at least in part on the performed facial detection. In such an example, the determination of the amount of motion may include determining the amount of motion based on the target user and not on the background area.

In some examples, power supply data logic module 418 may be communicatively coupled to the one or more processors and the one or more memory stores and may be configured to receive power supply data. The power supply data may include an indication of a current power source and/or an indication of battery charge level, where the indication of the current power source indicates whether the current power source is a battery-type power source or an external power source.

In various embodiments, motion estimation adjustment logic module 420 may be implemented in hardware, while software may implement visual data logic module 412, motion determination logic module 414, facial detection logic module 416, and/or power supply data logic module 418. For example, in some embodiments, motion estimation adjustment logic module 420 may be implemented by application-specific integrated circuit (ASIC) logic while visual data logic module 412, motion determination logic module 414, facial detection logic module 416, and/or power supply data logic module provided by software instructions executed by logic such as processors 406. However, the present disclosure is not limited in this regard and application-specific integrated circuit (ASIC) logic while visual data logic module 412, motion determination logic module 414, facial detection logic module 416, and/or power supply data logic module may be implemented by any combination of hardware, firmware and/or software. In addition, memory stores 408 may be any type of memory such as volatile memory (e.g., Static Random Access Memory (SRILAM), Dynamic Random Access Memory (DRAM), etc.) or non-volatile memory (e.g., flash memory, etc.), and so forth. In a non-limiting example, memory stores 408 may be implemented by cache memory.

In operation, some aspects of logic modules 306 may be implemented through a device driver interface (DDI) (not shown). In some examples media driver software might introduce a virtual video driver such as a kernel level driver (e.g., a device driver interface (DDI) as a kernel level driver of Windows™ OS). Such a virtual video driver may be utilized for video conferencing application or middleware to control the HME and Super HME features based on the usage model (e.g., via power tracking) and/or media content (e.g., via motion tracking or age detection). Accordingly, in various implementations, device driver interface (DDI) (not shown) may include at least a portion of one or more of logic modules 306 including motion determination logic module 414, power supply data logic module 418, motion estimation adjustment logic module 420, the like, and/or combinations thereof. For example, in some embodiments, motion estimation adjustment logic module 420 may be implemented as part of device driver interface (DDI) (not shown).

Figure 5:
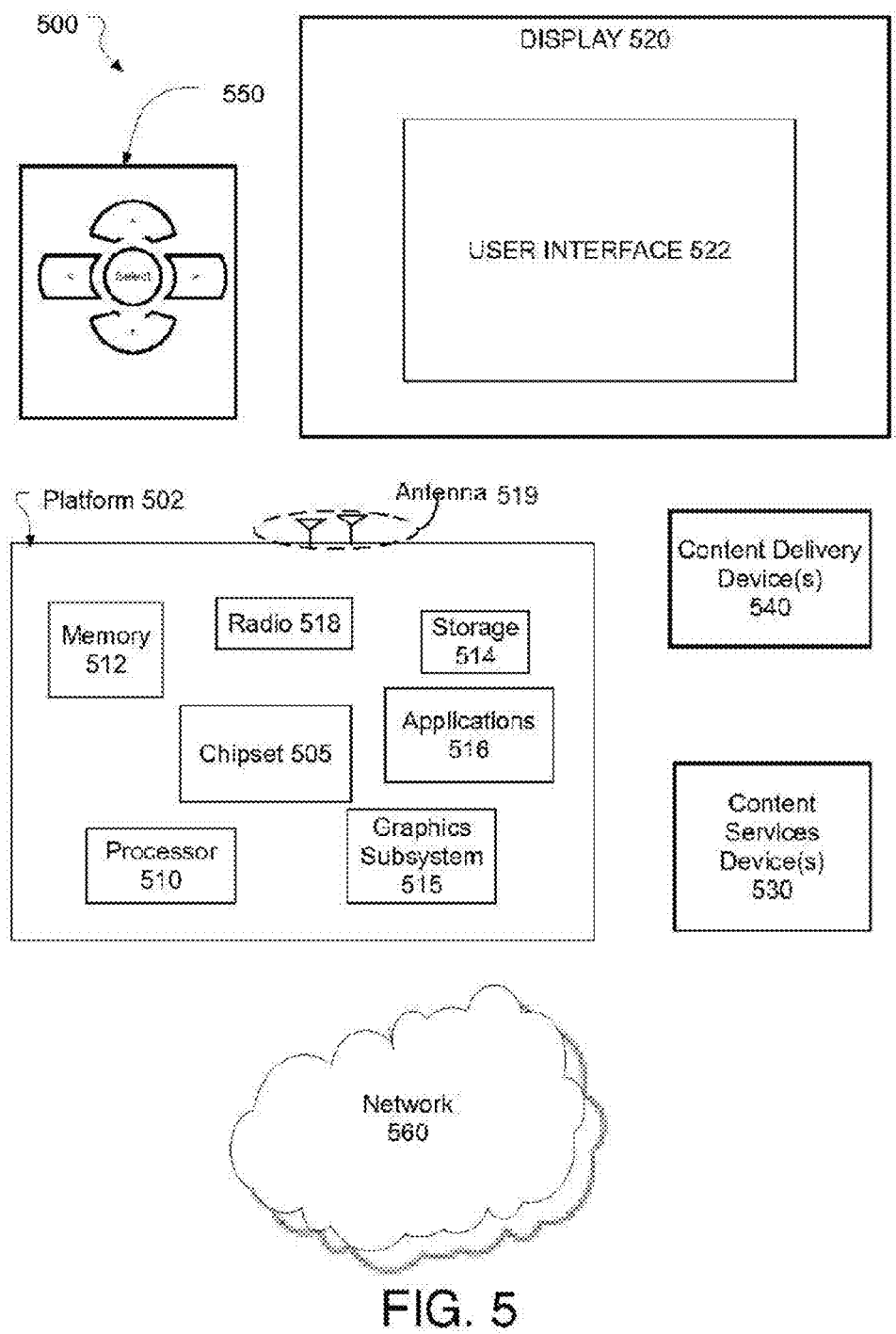
FIG. 5 is an illustrative diagram of an example system.

FIG. 5 illustrates an example system 500 in accordance with the present disclosure. In various implementations, system 500 may be a media system although system 500 is not limited to this context. For example, system 500 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In various implementations, system 500 includes a platform 502 coupled to a display 520. Platform 502 may receive content from a content device such as content services device(s) 530 or content delivery device(s) 540 or other similar content sources. A navigation controller 550 including one or more navigation features may be used to interact with, for example, platform 502 and/or display 520. Each of these components is described in greater detail below.

In various implementations, platform 502 may include any combination of a chipset 505, processor 510, memory 512, storage 514, graphics subsystem 515, applications 516 and/or radio 518 and antenna 519. Chipset 505 may provide intercommunication among processor 510, memory 512, storage 514, graphics subsystem 515, applications 516 and/or radio 518. For example, chipset 505 may include a storage adapter (not depicted) capable of providing intercommunication with storage 514.

Processor 510 may be implemented as a Complex Instruction Set Computer (CISC) or Reduced Instruction Set Computer (RISC) processors; x86 instruction set compatible processors, multi-core, or any other microprocessor or central processing unit (CPU). In various implementations, processor 510 may be dual-core processor(s), dual-core mobile processor(s), and so forth.

Memory 512 may be implemented as a volatile memory device such as, but not limited to, a Random Access Memory (RAM), Dynamic Random Access Memory (DRAM), or Static RAM (SRAM).

Storage 514 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage may include technology to increase the storage performance enhanced protection for valuable digital media when multiple hard drives are included, for example.

Graphics subsystem 515 may perform processing of images such as still or video for display. Graphics subsystem 515 may be a graphics processing unit (GPU) or a visual processing unit (VPU), for example. An analog or digital interface may be used to communicatively couple graphics subsystem 515 and display 520. For example, the interface may be any of a High-Definition Multimedia Interface, DisplayPort, wireless HDMI, and/or wireless HD compliant techniques. Graphics subsystem 515 may be integrated into processor 510 or chipset 505. In some implementations, graphics subsystem 515 may be a stand-alone card communicatively coupled to chipset 505.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 518 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 518 may operate in accordance with one or more applicable standards in any version.

In various implementations, display 520 may include any television type monitor or display. Display 520 may include, for example, a computer display screen, touch screen display, video monitor, television-like device, and/or a television. Display 520 may be digital and/or analog. In various implementations, display 520 may be a holographic display. Also, display 520 may be a transparent surface that may receive a visual projection. Such projections may convey various forms of information, images, and/or objects. For example, such projections may be a visual overlay for a mobile augmented reality (MAR) application. Under the control of one or more software applications 516, platform 502 may display user interface 522 on display 520.

In various implementations, content services device(s) 530 may be hosted by any national, international and/or independent service and thus accessible to platform 502 via the Internet, for example. Content services device(s) 530 may be coupled to platform 502 and/or to display 520. Platform 502 and/or content services device(s) 530 may be coupled to a network 560 to communicate (e.g., send and/or receive) media information to and from network 560. Content delivery device(s) 540 also may be coupled to platform 502 and/or to display 520.

In various implementations, content services device(s) 530 may include a cable television box, personal computer, network, telephone, Internet enabled devices or appliance capable of delivering digital information and/or content, and any other similar device capable of unidirectionally or bidirectionally communicating content between content providers and platform 502 and/display 520, via network 560 or directly. It will be appreciated that the content may be communicated unidirectionally and/or bidirectionally to and from any one of the components in system 500 and a content provider via network 560. Examples of content may include any media information including, for example, video, music, medical and gaming information, and so forth.

Content services device(s) 530 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 502 may receive control signals from navigation controller 550 having one or more navigation features. The navigation features of controller 550 may be used to interact with user interface 522, for example. In embodiments, navigation controller 550 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 550 may be replicated on a display (e.g., display 520) by movements of a pointer, cursor, focus ring, or other visual indicators displayed on the display. For example, under the control of software applications 516, the navigation features located on navigation controller 550 may be mapped to virtual navigation features displayed on user interface 522, for example. In embodiments, controller 550 may not be a separate component but may be integrated into platform 502 and/or display 520. The present disclosure, however, is not limited to the elements or in the context shown or described herein.

In various implementations, drivers (not shown) may include technology to enable users to instantly turn on and off platform 502 like a television with the touch of a button after initial boot-up, when enabled, for example. Program logic may allow platform 502 to stream content to media adaptors or other content services device(s) 530 or content delivery device(s) 540 even when the platform is turned "off." In addition, chipset 505 may include hardware and/or software support for 5.1 surround sound audio and/or high definition 7.1 surround sound audio, for example. Drivers may include a graphics driver for integrated graphics platforms. In embodiments, the graphics driver may comprise a peripheral component interconnect (PCI) Express graphics card.

In various implementations, any one or more of the components shown in system may be integrated. For example, platform 502 and content services device(s) 530 may be integrated, or platform 502 and content delivery device(s) 540 may be integrated, or platform 502, content services device(s) 530, and content delivery device(s) 540 may be integrated, for example. In various embodiments, platform 502 and display 520 may be an integrated unit. Display 520 and content service device(s) 530 may be integrated, or display 520 and content delivery device(s) 540 may be integrated, for example. These examples are not meant to limit the present disclosure.

In various embodiments, system 500 may be implemented as a wireless system, a wired system, or a combination or both. When implemented as a wireless system, system 500 may include components and interfaces suitable for communicating over a wireless shared media, such as one or more antennas 519, transmitters, receivers, transceivers, amplifiers, filters, control logic, and so forth. An example of wireless shared media may include portions of a wireless spectrum, such as the RF spectrum and so forth. When implemented as a wired system, system 500 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted pair wire, co-axial cable, fiber optics, and so forth.

Platform 502 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 5.

Figure 6:
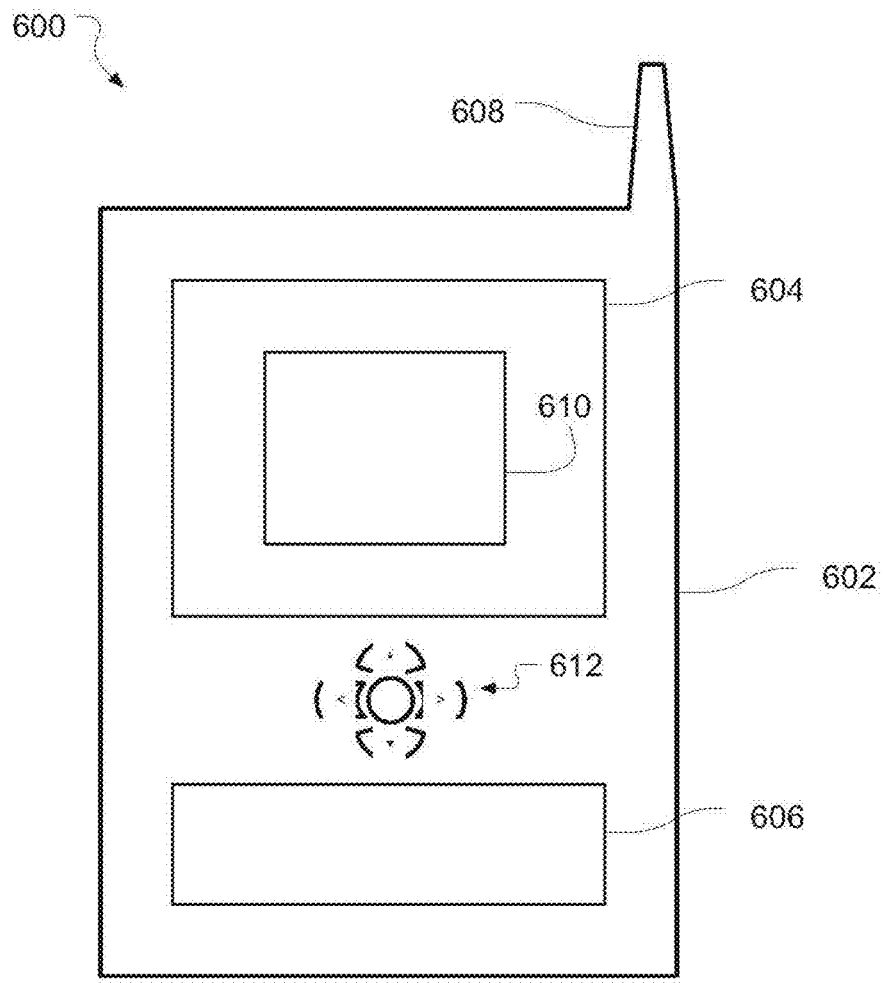
FIG. 6 is an illustrative diagram of an example system, all arranged in accordance with at least some implementations of the present disclosure.

As described above, system 500 may be embodied in varying physical styles or form factors. FIG. 6 illustrates implementations of a small form factor device 600 in which system 500 may be embodied. In embodiments, for example, device 600 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 6, device 600 may include a housing 602, a display 604, an input/output (I/O) device 606, and an antenna 608. Device 600 also may include navigation features 612. Display 604 may include any suitable display unit for displaying information appropriate for a mobile computing device. I/O device 606 may include any suitable I/O device for entering information into a mobile computing device. Examples for I/O device 606 may include an alphanumeric keyboard, a numeric keypad, a touch pad, input keys, buttons, switches, rocker switches, microphones, speakers, voice recognition device and software, and so forth. Information also may be entered into device 600 by way of microphone (not shown). Such information may be digitized by a voice recognition device (not shown). The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine-readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to further embodiments.

In one example, a computer-implemented method for content aware selective adjusting of motion estimation on a computer may include receiving visual data, where the visual data may include video. An amount of motion may be determined based at least in part on the received visual data. A motion estimation applied to the received visual data may be selectively adjusted based at least in part on the determined amount of motion.

In some examples, the method may include performing facial detection for at least one of one or more users based at least in part on the received visual data. A target user and a background area may be identified based at least in part on the performed facial detection, where the determination of the amount of motion may include determining the amount of motion based on the target user and not the background area. Power supply data may be received, where the power supply data may include an indication of a current power source and/or an indication of battery charge level. The indication of the current power source may indicate whether the current power source is a battery-type power source or an external power source. The motion estimation may be adjusted between a base level of motion estimation and an enhanced level of motion estimation, where the base level of motion estimation is associated with a first level of downscaled visual data and the enhanced level of motion estimation is associated with a second level of visual data where the second level of downscaling is greater than the first level of downscaling, and where the base level of motion estimation may include hierarchical motion estimation and the enhanced level of motion estimation may include super hierarchical motion estimation. The selectively adjusted motion estimation applied to the received visual data may include selectively adjusting the motion estimation to the enhanced level of motion estimation in response to an indication that the current power source is an external power source. The selectively adjusted motion estimation applied to the received visual data may include selectively adjusting the motion estimation to the base level of motion estimation in response to an indication that the current power source is a battery-type power source and/or an indication that the battery charge level is below a charge threshold value. The selectively adjusted motion estimation applied to the received visual data may include selectively adjusting the motion estimation to the enhanced level of motion estimation in response to an indication that the current power source is a battery-type power source, an indication that the battery charge level is above a given threshold value, and/or an indication that the determined amount of motion is above a motion threshold value. The selectively adjusted motion estimation applied to the received visual data may include selectively adjusting the motion estimation to the base level of motion estimation in response to an indication that the current power source is a battery-type power source, an indication that the battery charge level is above a given threshold value, and/or an indication that the determined amount of motion is below a motion threshold value. The selectively adjusted motion estimation applied to the received visual data may include selectively adjusting the motion estimation to the enhanced level of motion estimation in response to an identification of the target user as a child.

In other examples, a system for content aware selective adjusting of motion estimation on a computer may include an imaging device, one or more processors, one or more memory stores, a visual data logic module, a motion determination logic module, a motion estimation adjustment logic module, the like, and/or combinations thereof. The imaging device may be configured to capture visual data. The one or more processors may be communicatively coupled to the imaging device. The one or more memory stores may be communicatively coupled to the one or more processors. The visual data logic module may be communicatively coupled to the imaging device and configured to receive visual data, where the visual data may include video. The motion determination logic module may be communicatively coupled to the visual data logic module and may be configured to determine a amount of motion based at least in part on the received visual data. The motion estimation adjustment logic module may be communicatively coupled to the motion determination logic module and may be configured to selectively adjust a motion estimation applied to the received visual data based at least in part on the determined amount of motion. The video encoder may be communicatively coupled to the motion estimation adjustment logic module and may be configured to encode the received video data based at least in part on the selectively adjusted motion estimation.

In some examples, the system further include a facial detection logic module and/or a power supply data logic module. The facial detection logic module may be communicatively coupled to the visual data logic module and may be configured to perform facial detection for at least one of one or more users based at least in part on the received visual data and identify a target user and a background area based at least in part on the performed facial detection, and where the determination of the amount of motion may include determining the amount of motion based on the target user and not the background area. The power supply data logic module may be communicatively coupled to the one or more processors and the one or more memory stores and may be configured to receive power supply data, where the power supply data may include an indication of a current power source and/or an indication of battery charge level, where the indication of the current power source indicates whether the current power source is a battery-type power source or an external power source. The motion estimation may be adjusted between a base level of motion estimation and an enhanced level of motion estimation, where the base level of motion estimation is associated with a first level of downscaled visual data and the enhanced level of motion estimation is associated with a second level of visual data where the second level of downscaling is greater than the first level of downscaling, and where the base level of motion estimation may include hierarchical motion estimation and the enhanced level of motion estimation may include super hierarchical motion estimation. The selectively adjusted motion estimation applied to the received visual data may include selectively adjusting the motion estimation to the enhanced level of motion estimation in response to an indication that the current power source is an external power source. The selectively adjusted motion estimation applied to the received visual data may include selectively adjusting the motion estimation to the base level of motion estimation in response to an indication that the current power source is a battery-type power source and an indication that the battery charge level is below a charge threshold value. The selectively adjusted motion estimation applied to the received visual data may include selectively adjusting the motion estimation to the enhanced level of motion estimation in response to an indication that the current power source is a battery-type power source, an indication that the battery charge level is above a given threshold value, and an indication that the determined amount of motion is above a motion threshold value. The selectively adjusted motion estimation applied to the received visual data may include selectively adjusting the motion estimation to the base level of motion estimation in response to an indication that the current power source is a battery-type power source, an indication that the battery charge level is above a given threshold value, and an indication that the determined amount of motion is below a motion threshold value. The video encoder may include at least a portion of one or more of the logic modules including the visual data logic module, the motion determination logic module, the motion estimation adjustment logic module, the facial detection logic module, the power supply data logic module, the like, and/or combinations thereof. The selectively adjusted motion estimation applied to the received visual data may include selectively adjusting the motion estimation to the enhanced level of motion estimation in response to an identification of the target user as a child.

In a further example, at least one machine-readable medium may include a plurality of instructions that in response to being executed on a computing device, causes the computing device to perform the method according to any one of the above examples.

In a still further example, an apparatus may include means for performing the methods according to any one of the above examples.

The above examples may include specific combination of features. However, such the above examples are not limited in this regard and, in various implementations, the above examples may include the undertaking only a subset of such features, undertaking a different order of such features, undertaking a different combination of such features, and/or undertaking additional features than those features explicitly listed. For example, all features described with respect to the example methods may be implemented with respect to the example apparatus, the example systems, and/or the example articles, and vice versa.

What is claimed:

1. A computer-implemented method for content aware selective adjusting of motion estimation, comprising:
   receiving visual data from an imaging device, the received visual data comprising visual data of one or more users and a background area;
   performing, at one or more processors, facial detection for at least one of the one or more users based at least in part on the received visual data;
   identifying, at the one or more processors, a target user from the one or more users and the background area;
   determining, at the one or more processors, an amount of motion associated with the target user and not the background area; and
   selectively adjusting, at the one or more processors, a motion estimation applied to the received visual data based at least in part on the determined amount of motion.

2. The method of claim 1, wherein the motion estimation is adjusted between a base level of motion estimation and an enhanced level of motion estimation, and
   wherein the base level of motion estimation is associated with a first level of downscaled visual data and the enhanced level of motion estimation is associated with a second level of visual data, the second level of downscaling being greater than the first level of downscaling.

3. The method of claim 1, wherein the motion estimation is adjusted between a base level of motion estimation and an enhanced level of motion estimation,
   wherein the base level of motion estimation is associated with a first level of downscaled visual data and the enhanced level of motion estimation is associated with a second level of visual data, the second level of downscaling being greater than the first level of downscaling, and
   wherein the base level of motion estimation comprises hierarchical motion estimation and the enhanced level of motion estimation comprises super hierarchical motion estimation.

4. The method of claim 1, further comprising:
   receiving, at the one or more processors, power supply data, the power supply data comprising an indication of a current power source and/or an indication of battery charge level, and the indication of the current power source indicating whether the current power source comprises a battery-type power source or an external power source, and
   wherein the selectively adjusted motion estimation applied to the received visual data comprises selectively adjusting the motion estimation to the enhanced level of motion estimation in response to an indication that the current power source comprises an external power source.

5. The method of claim 1, further comprising:
   receiving, at the one or more processors, power supply data, the power supply data comprising an indication of a current power source and/or an indication of battery charge level, and the indication of the current power source indicating whether the current power source comprises a battery-type power source or an external power source, and
   wherein the selectively adjusted motion estimation applied to the received visual data comprises selectively adjusting the motion estimation to the base level of motion estimation in response to an indication that the current power source comprises a battery-type power source and an indication that the battery charge level is below a charge threshold value.

6. The method of claim 1, further comprising:
   receiving, at the one or more processors, power supply data, the power supply data comprising an indication of a current power source and/or an indication of battery charge level, and the indication of the current power source indicating whether the current power source comprises a battery-type power source or an external power source, and
   wherein the selectively adjusted motion estimation applied to the received visual data comprises selectively adjusting the motion estimation to the enhanced level of motion estimation in response to an indication that the current power source comprises a battery-type power source, an indication that the battery charge level is above a given threshold value, and an indication that the determined amount of motion is above a motion threshold value.

7. The method of claim 1, further comprising:
   receiving, at the one or more processors, power supply data, the power supply data comprising an indication of a current power source and/or an indication of battery charge level, and the indication of the current power source indicating whether the current power source comprises a battery-type power source or an external power source, and wherein the selectively adjusted motion estimation applied to the received visual data comprises selectively adjusting the motion estimation to the base level of motion estimation in response to an indication that the current power source comprises a battery-type power source, an indication that the battery charge level is above a given threshold value, and an indication that the determined amount of motion is below a motion threshold value.

8. The method of claim 1, wherein
identifying the target user is based at least in part on the performed facial detection for the at least one of the one or more users, and
wherein the selectively adjusted motion estimation applied to the received visual data comprises selectively adjusting the motion estimation to the enhanced level of motion estimation in response to an identification of the target user as a child.

9. The method of claim 1, wherein
identifying the target user and the background area is based at least in part on the performed facial detection for the at least one of the one or more users,
the method further comprising:
receiving, at the one or more processors, power supply data, the power supply data comprising an indication of a current power source and/or an indication of battery charge level, and the indication of the current power source indicating whether the current power source comprises a battery-type power source or an external power source, and
wherein the motion estimation is adjusted between a base level of motion estimation and an enhanced level of motion estimation, the base level of motion estimation being associated with a first level of downscaled visual data and the enhanced level of motion estimation being associated with a second level of visual data, the second level of downscaling being greater than the first level of downscaling, and the base level of motion estimation comprising hierarchical motion estimation and the enhanced level of motion estimation comprising super hierarchical motion estimation,
wherein the selectively adjusted motion estimation applied to the received visual data comprises selectively adjusting the motion estimation to the enhanced level of motion estimation in response to an indication that the current power source comprises an external power source,
wherein the selectively adjusted motion estimation applied to the received visual data comprises selectively adjusting the motion estimation to the base level of motion estimation in response to an indication that the current power source comprises a battery-type power source and an indication that the battery charge level is below a charge threshold value,
wherein the selectively adjusted motion estimation applied to the received visual data comprises selectively adjusting the motion estimation to the enhanced level of motion estimation in response to an indication that the current power source comprises a battery-type power source, an indication that the battery charge level is above a given threshold value, and an indication that the determined amount of motion is above a motion threshold value,
wherein the selectively adjusted motion estimation applied to the received visual data comprises selectively adjusting the motion estimation to the base level of motion estimation in response to an indication that the current power source comprises a battery-type power source, an indication that the battery charge level is above a given threshold value, and an indication that the determined amount of motion is below a motion threshold value, and
wherein the selectively adjusted motion estimation applied to the received visual data comprises selectively adjusting the motion estimation to the enhanced level of motion estimation in response to an identification of the target user as a child.

10. A system for content aware selective adjusting of motion estimation on a computer, comprising:
an imaging device configured to capture visual data, the captured visual data comprising visual data of one or more users and a background area;
a visual data logic module communicatively coupled to imaging device and configured to receive the captured visual data;
a facial detection logic module communicatively coupled to the visual data logic module and configured to perform facial detection for at least one of one or more users based at least in part on the received visual data, the facial detection logic module further configured to identify a target user from the one or more users and a background area based at least in part on the performed facial detection;
a motion determination logic module communicatively coupled to the visual data logic module and configured to determine ana amount of motion associated with the target user and not the background area based at least in part on the received visual data;
a motion estimation adjustment logic module communicatively coupled to the motion determination logic module and configured to selectively adjust a motion estimation applied to the received visual data based at least in part on the determined amount of motion; and
a video encoder communicatively coupled to the motion estimation adjustment logic module and configured to encode the received video data based at least in part on the selectively adjusted motion estimation.

11. The system of claim 10, wherein the motion estimation is adjusted between a base level of motion estimation and an enhanced level of motion estimation, and
wherein the base level of motion estimation is associated with a first level of downscaled visual data and the enhanced level of motion estimation is associated with a second level of visual data, the second level of downscaling being greater than the first level of downscaling.

12. The system of claim 10, wherein the motion estimation is adjusted between a base level of motion estimation and an enhanced level of motion estimation,
wherein the base level of motion estimation is associated with a first level of downscaled visual data and the enhanced level of motion estimation is associated with a second level of visual data, the second level of downscaling being greater than the first level of downscaling, and
wherein the base level of motion estimation comprises hierarchical motion estimation and the enhanced level of motion estimation comprises super hierarchical motion estimation.

13. The system of claim 10, further comprising:
a power supply data logic module communicatively coupled to the motion estimation adjustment logic module and configured to receive power supply data, the power supply data comprising an indication of a current power source and/or an indication of battery charge level, and the indication of the current power source indicates whether the current power source comprises a battery-type power source or an external power source, and wherein the selectively adjusted motion estimation applied to the received visual data comprises selectively adjusting the motion estimation to the enhanced level of motion estimation in response to an indication that the current power source comprises an external power source.

14. The system of claim 10, further comprising:

a power supply data logic module communicatively coupled to the motion estimation adjustment logic module and configured to receive power supply data, the power supply data comprising an indication of a current power source and/or an indication of battery charge level, and the indication of the current power source indicates whether the current power source comprises a battery-type power source or an external power source, and wherein the selectively adjusted motion estimation applied to the received visual data comprises selectively adjusting the motion estimation to the base level of motion estimation in response to an indication that the current power source comprises a battery-type power source and an indication that the battery charge level is below a charge threshold value.

15. The system of claim 10, further comprising:

a power supply data logic module communicatively coupled to the motion estimation adjustment logic module and configured to receive power supply data, the power supply data comprising an indication of a current power source and/or an indication of battery charge level, and the indication of the current power source indicates whether the current power source comprises a battery-type power source or an external power source, and wherein the selectively adjusted motion estimation applied to the received visual data comprises selectively adjusting the motion estimation to the enhanced level of motion estimation in response to an indication that the current power source comprises a battery-type power source, an indication that the battery charge level is above a given threshold value, and an indication that the determined amount of motion is above a motion threshold value.

16. The system of claim 10, further comprising:

a power supply data logic module communicatively coupled to the motion estimation adjustment logic module and configured to receive power supply data, the power supply data comprising an indication of a current power source and/or an indication of battery charge level, and the indication of the current power source indicates whether the current power source comprises a battery-type power source or an external power source, and wherein the selectively adjusted motion estimation applied to the received visual data comprises selectively adjusting the motion estimation to the base level of motion estimation in response to an indication that the current power source comprises a battery-type power source, an indication that the battery charge level is above a given threshold value, and an indication that the determined amount of motion is below a motion threshold value.

17. The system of claim 10, wherein the video encoder comprises at least a portion of one or more of the logic modules including the visual data logic module, the motion determination logic module, and the motion estimation adjustment logic module.

18. The system of claim 10, wherein the selectively adjusted motion estimation applied to the received visual data comprises selectively adjusting the motion estimation to the enhanced level of motion estimation in response to an identification of the target user as a child.

19. The system of claim 10, further comprising:

a power supply data logic module communicatively coupled to the motion estimation adjustment logic module and configured to receive power supply data, wherein the power supply data comprising an indication of a current power source and/or an indication of battery charge level, and the indication of the current power source indicates whether the current power source comprises a battery-type power source or an external power source, wherein the motion estimation is adjusted between a base level of motion estimation and an enhanced level of motion estimation, the base level of motion estimation being associated with a first level of downscaled visual data and the enhanced level of motion estimation beings associated with a second level of visual data, the second level of downscaling being greater than the first level of downscaling, and the base level of motion estimation comprising hierarchical motion estimation and the enhanced level of motion estimation comprising super hierarchical motion estimation, wherein the selectively adjusted motion estimation applied to the received visual data comprises selectively adjusting the motion estimation to the enhanced level of motion estimation in response to an indication that the current power source comprises an external power source, wherein the selectively adjusted motion estimation applied to the received visual data comprises selectively adjusting the motion estimation to the base level of motion estimation in response to an indication that the current power source comprises a battery-type power source and an indication that the battery charge level is below a charge threshold value, wherein the selectively adjusted motion estimation applied to the received visual data comprises selectively adjusting the motion estimation to the enhanced level of motion estimation in response to an indication that the current power source comprises a battery-type power source, an indication that the battery charge level is above a given threshold value, and an indication that the determined amount of motion is above a motion threshold value, and wherein the selectively adjusted motion estimation applied to the received visual data comprises selectively adjusting the motion estimation to the base level of motion estimation in response to an indication that the current power source comprises a battery-type power source, an indication that the battery charge level is above a given threshold value, and an indication that the determined amount of motion is below a motion threshold value, wherein the selectively adjusted motion estimation applied to the received visual data comprises selectively adjusting the motion estimation to the enhanced level of motion estimation in response to an identification of the target user as a child.

20. An article comprising a machine-readable medium comprising a plurality of instructions that in response to being executed on a computing device result in:
- receiving visual data from an imaging device, the received visual data comprising visual data of one or more users and a background area
- performing, at one or more processors, facial detection for at least one of the one or more users based at least in part on the received visual data;
- identifying, at the one or more processors, a target user from the one or more users and the background area;
- determining, at the one or more processors, an amount of motion associated with the target user and not the background area; and
- selectively, at the one or more processors, adjusting a motion estimation applied to the received visual data based at least in part on the determined amount of motion.

21. The article of claim 20, wherein the machine-readable medium further comprises instructions that in response to being executed on the computing device result in:
- receiving, at the one or more processors, power supply data, the power supply data comprising an indication of a current power source and/or an indication of battery charge level, and the indication of the current power source indicating whether the current power source comprises a battery-type power source or an external power source,
- wherein the motion estimation is adjusted between a base level of motion estimation and an enhanced level of motion estimation, the base level of motion estimation is associated with a first level of downscaled visual data and the enhanced level of motion estimation is associated with a second level of visual data, the second level of downscaling being greater than the first level of downscaling, and the base level of motion estimation comprising hierarchical motion estimation and the enhanced level of motion estimation comprising super hierarchical motion estimation,
- wherein the selectively adjusted motion estimation applied to the received visual data comprises selectively adjusting the motion estimation to the enhanced level of motion estimation in response to an indication that the current power source comprises an external power source,
- wherein the selectively adjusted motion estimation applied to the received visual data comprises selectively adjusting the motion estimation to the base level of motion estimation in response to an indication that the current power source comprises a battery-type power source and an indication that the battery charge level is below a charge threshold value,
- wherein the selectively adjusted motion estimation applied to the received visual data comprises selectively adjusting the motion estimation to the enhanced level of motion estimation in response to an indication that the current power source comprises a battery-type power source, an indication that the battery charge level is above a given threshold value, and an indication that the determined amount of motion is above a motion threshold value,
- wherein the selectively adjusted motion estimation applied to the received visual data comprises selectively adjusting the motion estimation to the base level of motion estimation in response to an indication that the current power source comprises a battery-type power source, an indication that the battery charge level is above a given threshold value, and an indication that the determined amount of motion is below a motion threshold value, and
- wherein the selectively adjusted motion estimation applied to the received visual data comprises selectively adjusting the motion estimation to the enhanced level of motion estimation in response to an identification of the target user as a child.

22. The article of claim 20, wherein the machine-readable medium further comprises instructions that in response to being executed on the computing device result in:
- receiving, at the one or more processors, power supply data, the power supply data comprising an indication of a current power source and/or an indication of battery charge level, and the indication of the current power source indicating whether the current power source comprises a battery-type power source or an external power source, and
- wherein the selectively adjusted motion estimation applied to the received visual data comprises selectively adjusting the motion estimation to the enhanced level of motion estimation in response to an indication that the current power source comprises an external power source.

23. The article of claim 20, wherein the machine-readable medium further comprises instructions that in response to being executed on the computing device result in:
- receiving, at the one or more processors, power supply data, the power supply data comprising an indication of a current power source and/or an indication of battery charge level, and the indication of the current power source indicating whether the current power source comprises a battery-type power source or an external power source, and
- wherein the selectively adjusted motion estimation applied to the received visual data comprises selectively adjusting the motion estimation to the base level of motion estimation in response to an indication that the current power source comprises a battery-type power source and an indication that the battery charge level is below a charge threshold value.

24. The article of claim 20, wherein the machine-readable medium further comprises instructions that in response to being executed on the computing device result in:
- receiving, at the one or more processors, power supply data, the power supply data comprising an indication of a current power source and/or an indication of battery charge level, and the indication of the current power source indicating whether the current power source comprises a battery-type power source or an external power source, and
- wherein the selectively adjusted motion estimation applied to the received visual data comprises selectively adjusting the motion estimation to the enhanced level of motion estimation in response to an indication that the current power source comprises a battery-type power source, an indication that the battery charge level is above a given threshold value, and an indication that the determined amount of motion is above a motion threshold value.

25. The article of claim 20, wherein the machine-readable medium further comprises instructions that in response to being executed on the computing device result in:
- receiving, at the one or more processors, power supply data, the power supply data comprising an indication of a current power source and/or an indication of battery charge level, and the indication of the current power source indicating whether the current power source comprises a battery-type power source or an external power source, and wherein the selectively adjusted motion estimation applied to the received visual data comprises selectively adjusting the motion estimation to the base level of motion estimation in response to an indication that the current power source comprises a battery-type power source, an indication that the battery charge level is above a given threshold value, and an indication that the determined amount of motion is below a motion threshold value.

* * * * *